United States Patent

Stockebrand

[15] 3,636,516
[45] Jan. 18, 1972

[54] POSITION ERROR SENSOR

[72] Inventor: Thomas C. Stockebrand, Boxboro, Mass.
[73] Assignee: Digital Equipment Corporation, Maynard, Mass.
[22] Filed: July 11, 1969
[21] Appl. No.: 841,087

[52] U.S. Cl. ............................340/149, 340/166, 340/339, 235/61.7
[51] Int. Cl. ......................................G06g 7/04, G06k 11/00
[58] Field of Search .......................340/149, 166, 337, 339; 178/18, 19, 20

[56] References Cited

UNITED STATES PATENTS

| | | | |
|---|---|---|---|
| 3,191,315 | 6/1965 | Hannah | 340/149 |
| 3,337,860 | 8/1967 | O'Hara | 178/19 |
| 3,342,935 | 9/1967 | Leifer et al. | 340/166 |
| 3,474,231 | 10/1969 | Laube | 340/337 |

Primary Examiner—John W. Caldwell
Assistant Examiner—Howard Cohen
Attorney—Cesari and McKenna

[57] ABSTRACT

An operator manually selects a point on a parts drawing where a machining operation is to be performed. The location of the selected point is encoded and the corresponding position data compared with stored position data of the nearest grid intersection corresponding to the point where the machining operation is actually to be performed. If the operator selected point satisfies a predetermined tolerance, the stored grid intersection position data is entered into a separate store. If not, an alarm is sounded, and the operator reselects the point.

8 Claims, 2 Drawing Figures

PATENTED JAN 18 1972

3,636,516

INVENTOR
THOMAS C. STOCKEBRAND
BY
Blair, Cesari & St. Onge
ATTORNEYS

POSITION ERROR SENSOR

BACKGROUND OF THE INVENTION

The invention has particular, but not necessarily limited, application to entering instruction data into a storage medium for ultimate use in controlling the operation of machine tools. Tape-controlled machine tools, for example, are in wide use. The operating precision of these machine tools, of course, depends on the accuracy of the machine instructions recorded on magnetic tape or punched in paper tape.

The tape may be prepared in a number of ways. For example, written machine instructions may be recorded on the tape by a keypunch operator. This procedure is subject to human errors of transcription. To partially overcome this problem, position sensors have been devised wherein a pointer or stylus is positioned to points on a parts drawing where machine operations are to be performed. When the position of the drawing is appropriately referenced to the sensor, the position of the pointer can be encoded into position data which is fed to a keypunch for automatic entry on the tape. If the initial manual positioning of the stylus is precise, then assuming system accuracy, at least the machine position instructions will be properly recorded on the tape. In practice, there is no guarantee that either of these assumptions is always true. Operator error can and does occur in positioning the stylus, and such errors are transferred to and entered on the tape. Then too, any system inaccuracies, such as may occur upon encoding of the stylus position, automatically show up on the tape. Typically, both types of errors are not uncovered until a part machined according to the tape instructions is inspected. The existence of errors is expensive not only from the standpoint of production delays, but also because of the time and effort required to track down their source.

It has been proposed that data processing techniques be employed to minimize the potential of human error in the preparation of instruction tape for machine tools. A drawing of the part to be machined is prepared by a draftsman, and the locations of points on the part designated for machining are selected to coincide with intersections of a grid pattern printed on the drawing sheet itself or on a separate sheet superimposed with the drawing sheet and visible therethrough. An operator preparing the machine tool instruction tape takes the parts drawing and references its position relative to a position sensor. The stylus is then manually positioned to a point on the illustrated part where a machining operating is to be performed. The position of the stylus is encoded and its position data is used by computer as a a basis for calculating the position of the grid intersection nearest to the stylus position. The calculated grid intersection position data is entered on the tape.

Assuming the lack of system error, this technique works marvelously so long as the operator is reasonably careful in positioning the stylus to select the points. However, when the operator strays from the correct point by a distance corresponding to more than half the spacing between grid intersections, the position data of the grid intersection adjacent the correct one is retrieved from memory and entered on the tape. An error therefore arises.

Due to the tedium involved in positioning the stylus to point after point on the parts drawing, straying from the correct points is an ever-present hazard. The fact that minor deviations in positioning the stylus are permissible greatly speeds up the operator's task, but it also encourages sloppiness. Finally, deviations become so large as to cause erroneous entries on the tape.

SUMMARY OF THE INVENTION

According to the present invention, there is provided method and apparatus for alerting an operator to manually execute positioning errors and/or impending system malfunctions. In the preferred embodiment of the invention, the actual position of a pointer under the control of an operator is compared with the position where the pointer should be. If the two positions are displaced by a distance exceeding a predetermined tolerance, an alarm is activated to alert the operator of a possible position error. The operator then attempts to reposition the pointer more precisely at the correct location, and the steps are repeated. If the alarm is again activated, indications are that the system is tending toward malfunctions, and servicing is warranted.

More particularly, the invention comprises an encoder for converting the actual position of the pointer to position data. This actual position data is compared with the assumed correct position, i.e., the coordinates of the closest grid intersection. A detector analyzes the difference therebetween, and, if the difference is within tolerance, the assumed position data is recorded on a separate recording medium. If not, the alarm is activated.

There is thus provided a tolerance band surrounding each grid intersection. The tolerance band extends less than one-half the distance to the adjacent intersections. Consequently, a dead band is provided between each grid intersection and all others adjacent thereto. When the pointer is positioned at a location corresponding to this dead band, the alarm is activated.

While the present invention does not indicate positioning errors of such magnitude that the pointer is within the tolerance band of a grid intersection adjacent the correct one, it does provide warning to the operator that he is tending to stray further and further from the correct positions. It has been determined that positioning deviations typically increase progressively, and by providing the tolerance bands, the operator is alerted before his positioning deviations progress to the point where erroneous position data is recorded on the recording medium.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWING

For a fuller understanding of the nature and objects of the invention, reference should be had to the following detailed description taken in connection with the accompanying drawing, in which.

DETAILED DESCRIPTION OF THE INVENTION

Figure 1:
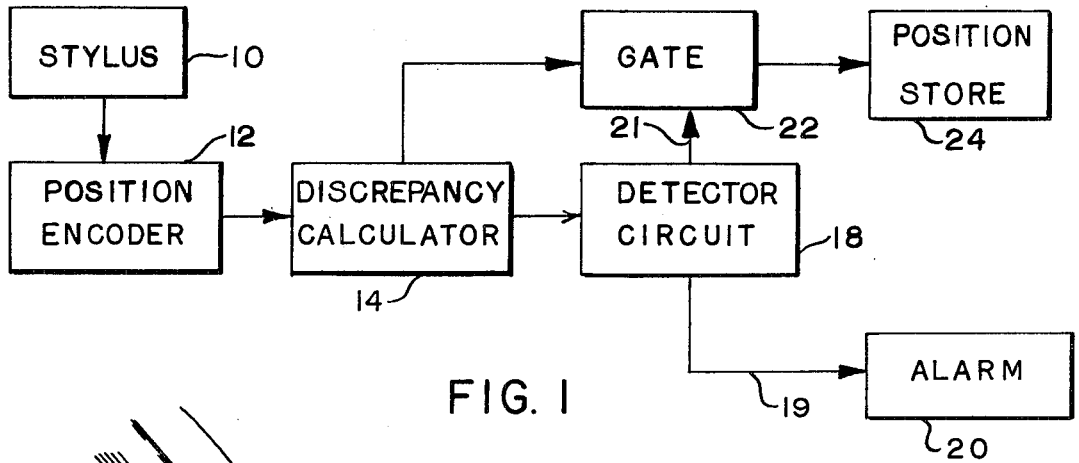
FIG. 1 is an overall block diagram of an embodiment of the invention.

The apparatus of the invention, seen in FIG. 1, includes a pointer or stylus 10, which is manipulated by an operator to position the stylus tip at a desired point or location on a parts drawing, or the like. The stylus 10 is linked to a position encoder 12 serving to convert the spatial position of the stylus tip into corresponding position data. This position data is expressed in Cartesian (X and Y) coordinates, through other coordinates, such as polar, can be used. The stylus 10 and position encoder 12 in combination comprise a position sensor of which various types are known in the art.

The sensed coordinates of the stylus 10 is fed to a discrepancy calculator 14 that calculates the differences between these coordinates and the coordinates of the nearest grid intersection. The displacement, if any, of the stylus position from the grid intersection position is represented by a difference output from the calculator 14 which is supplied to a detector circuit 18. This detector circuit operates to evaluate this displacement or deviation, and if it exceeds a predetermined minimum, an output is generated on line 19 for activating an alarm 20. The alarm alerts the operator to the fact that the stylus position has deviated beyond a predetermined tolerance limit from the correct position necessary to select the desired point.

On the other hand, if the deviation of the stylus position from the nearest grid intersection, as represented by the output from calculator 14, is within the predetermined tolerance, the detector circuit 18 provides an output on line 21 for conditioning a gate circuit 22. The gate passes the position data of the grid intersection retrieved from the calculator to a position store 24, which may constitute a storage tape to be ultimately used for controlling a machine tool.

The calculator 14, detector circuit 18 and gate 22 may be constituted in a general purpose computer.

In the practice of the invention, the draftsman preparing the parts drawing uses as a reference a particular grid whose intersection position data is entered into the grid memory 16. The particular grid may be imprinted on the sheet on which the parts drawing is made, or the grid may be provided on a separate sheet superimposed with the drawing sheet and visible therethrough. In the situation, for example, where the part drawn by the draftsman is a printed circuit board, a grid is chosen such that its dimensions permit the location of the various holes to be drilled through the circuit board precisely at various grid intersections.

The completed parts drawing is then taken by the operator and oriented in reference to the position sensor. This may be done by having one or more reference marks on the parts drawing registered with locating reference marks on the position sensor platen or table. The position encoder 12 or the calculator 14 may be calibrated so as to account for a certain enlargement or increased scale of the parts drawing. Typically, enlargement is resorted to since, in practice, the distance 26 (FIG. 2) between grid intersections in actual dimensions may be in the order of 0.10 inch.

As previously noted, the detector circuit 18 is set up to establish tolerance limits, i.e., a tolerance band effectively surrounding each grid intersection. These tolerance bands are indicated illustratively as squares 28 in FIG. 2. The width 30 of each tolerance band is such that there is established a dead band 29 separating adjacent tolerance bands. In a specific example, if the distance W in the X and Y direction between grid intersections is 0.01 inch, the width of each tolerance band 28 may be 0.060 inch, leaving a dead band spacing 32 in the X and Y directions of 0.040 inch. The calculator 14 and detector circuit 18 may then be arranged to operate as follows.

The calculator is programmed to divide the X coordinate output of the encoder 12 by the X spacing $W_x$ between adjacent grid intersections. If the remainder is zero, the stylus position is exactly on one of the vertical grid lines, e.g., the line 33. If the remainder is 0.030 inch or less, the stylus position is within the tolerance limit to the right of the vertical line 33. If the remainder is between 0.030 and 0.070 inch, the stylus is in the dead band. Finally, if the remainder is 0.070 inch or greater, the stylus position is within the tolerance limit to the right of the next vertical grid line 35. The calculator makes the same computation for the Y coordinate, dividing the Y output of the encoder 12 by the Y grid spacing $W_Y$.

The detector 18 senses whether either the X or Y coordinate is in a dead band and if it is, the detector actuates the alarm 20. If neither coordinate is out of tolerance, the coordinates of the correct grid intersection are read out as noted above. In this connection, it should be noted that if the remainder after division by the calculator is within the tolerance limit to the right of a vertical line, e.g., the line 33, the detector 18 causes the calculator to transmit the whole number part of the quotient, i.e., the X coordinate of the line 33 in the example. If, on the other hand, the remainder is within the tolerance limit to the left of the next line 35, the calculator is signalled to transmit the sum of (a) the whole number part of the quotient and (b) $W_x$, i.e., the X coordinate of the line 35. Again, the same arrangement is followed for Y coordinates.

Figure 2:
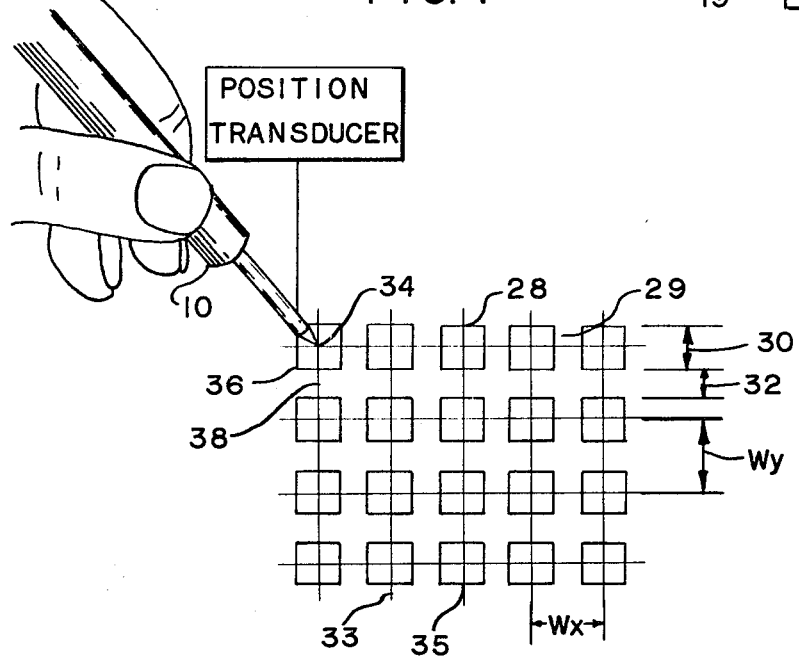
FIG. 2 is a diagrammatic illustration of the manual positioning of a stylus at a desired location on a drawing symbolically overlaid with a grid whose intersections are surrounded by tolerance bands used in detecting stylus position errors.

Accordingly, with further reference to FIG. 2, the alarm 10 is not activated when the operator intends, for example, to designate the center of a drilled hole whose location corresponds to grid intersection 34, but inadvertently positions the stylus tip at point 36. Since point 36 is within the tolerance band 28 surrounding grid intersection 34, the detector circuit 18 still conditions gate 22 to pass the position data of grid intersection 34 to the position store 24.

However, if the operator, intending to select a point on the drawing corresponding to grid intersection 34, actually positions the stylus tip at point 38, the detector circuit 18 recognizes that point 38 is beyond the tolerance band 28 and within the dead band 29. Accordingly, the alarm 20 is activated over line 19, alerting the operator that he has committed a positioning error. The operator will then reposition the stylus 10, making a concerted effort to at least come within the tolerance band 28 surrounding his intended target, grid intersection 34.

It will be appreciated that if the operator is so careless as to position the stylus within the tolerance band of an adjacent grid intersection while intending to select grid intersection 34, the apparatus of FIG. 1 will proceed on the basis that the adjacent grid intersection is the correct one and enter its position data into the position store 24. Thus, an erroneous position has been entered into the position store. However, it is found that operator positioning deviations typically increase progressively, and thus by providing dead band 29 between the grid intersections, the operator is alerted to his increasing carelessness. Consequently, impending positioning errors are largely avoided.

Moreover, the invention has the additional attribute of serving to indicate impending system malfunctions. If the alarm 20 is activated to, in effect, indicate an intolerable positioning deviation, and after several attempts by the operator to correctly position the stylus 10, the alarm still sounds, it then is apparent that the system, not the operator, is at fault. This being the case, system servicing can be initiated promptly and quite possibly before erroneous instructions have been entered into the position store 24.

It will be appreciated that the detector circuit 18 may be set up such that the tolerance band 28 surrounding each grid intersection has some other form than a square. Regardless of the configuration of the tolerance bands, the important consideration is to provide an intermediate dead band 29 between all adjacent tolerance bands.

Also, it will be appreciated that in one sense the calculator 14 stores the various grid intersections and compares the sensed position coordinates with the stored coordinates to (1) find the nearest grid intersection and (2) ascertain the differences in coordinates. The detector 18 then responds to these differences.

It will thus be seen that the objects set forth above, among those made apparent from the preceding description, are efficiently attained.

I claim:

1. Position error sensing apparatus comprising, in combination:
   A. selecting means for selecting a desired point:
   B. a position locater connected to said selecting means for developing coordinates of the position of said selecting means relative to a predetermined coordinate system;
   C. means for comparing the output of said position locater with the coordinates of intersections of a predetermined grid,
   D. a detector evaluating the output of said comparing means; and
   E. an alarm activated by said detector when a coordinate provided by said locater differs from a coordinate of the closest grid intersection by an amount exceeding a predetermined tolerance, thereby to indicate a positioning error.

2. The apparatus defined in claim 1, which further includes
   A. a storage medium; and B. gating means conditioned by said comparing means when said coordinate differences are within tolerance for passing the coordinates of said closest intersection to said storage medium for storage.

3. The apparatus defined in claim 2
A. in which said position locater provides an output in Cartesian coordinates,
B. in which said comparing means includes
  1. means for dividing the coordinates from the locater by the spacings in said grid, and
  2. a detector responsive to the remainder after division to indicate whether or not the coordinates from the locater are within tolerance.

4. The apparatus defined in claim 3 wherein said detector is conditioned to
A. establish a tolerance band surrounding each said grid intersection,
B. adjacent tolerance bands being separated by a dead band,
C. whereby positioning said selecting means at points falling in said dead band causes activation of said alarm.

5. A method for sensing position errors comprising the steps of:
A. manually positioning a pointer to select a desired point;
B. converting the pointer position to position coordinate data with respect to a predetermined coordinate reference axis;
C. generating the position coordinate data of the desired point;
D. comparing the pointer position coordinate data with the desired point position data;
E. actuating an alarm when the pointer is displaced from the desired point by a distance exceeding a predetermined tolerance; and
F. manually repositioning the pointer when the alarm is actuated.

6. The method defined in claim 5 including the step of recording the generated position data of the desired point when the position of the pointer is within tolerance.

7. The method defined in claim 6 wherein said generating step includes
A. storing position data of a plurality of potential desired points subject to manual selection, and
B. retrieving the position data most nearly corresponding to the position of the pointer for comparison with the pointer position data pursuant to each manual selection.

8. The method defined in claim 7 including the step of
A. establishing a tolerance band surrounding each desired point subject to manual selection,
  1. the dimensions of the tolerance bands being such as to provide dead band spacing between adjacent tolerance bands,
  2. whereby positioning the pointer at locations in the dead band results in activation of the alarm.

* * * * *